(12) United States Patent
Jao et al.

(10) Patent No.: US 6,950,654 B2
(45) Date of Patent: Sep. 27, 2005

(54) DATA STREAM PROTECTION SYSTEM AND METHOD OF USE

(75) Inventors: Tjo San Jao, Beaconsfield (CA); Anader Benyamin-Seeyar, Montreal (CA)

(73) Assignee: Harris Corporation, Melbourne, FL (US)

( * ) Notice: Subject to any disclaimer, the term of this patent is extended or adjusted under 35 U.S.C. 154(b) by 435 days.

(21) Appl. No.: 10/178,533

(22) Filed: Jun. 25, 2002

(65) Prior Publication Data

US 2003/0236090 A1 Dec. 25, 2003

(51) Int. Cl.⁷ .............................. H04B 1/38; H04M 1/00
(52) U.S. Cl. ....................... 455/424; 455/560; 370/217; 370/242
(58) Field of Search ................................. 455/423–424, 455/560–561, 404.1, 67.11, 438, 562.1; 370/216–217, 221, 242, 244

(56) References Cited

U.S. PATENT DOCUMENTS

| | | | |
|---|---|---|---|
| 5,014,261 A | | 5/1991 | Shinbashi et al. |
| 5,506,833 A | * | 4/1996 | Nemoto ...................... 370/228 |
| 5,796,717 A | | 8/1998 | Shinbashi et al. |
| 6,005,841 A | * | 12/1999 | Kicklighter .................. 370/217 |
| 6,108,300 A | * | 8/2000 | Coile et al. .................. 370/217 |
| 6,161,024 A | * | 12/2000 | Komara ..................... 455/562.1 |
| 6,408,182 B1 | | 6/2002 | Davidson et al. |
| 6,513,092 B1 | * | 1/2003 | Gorshe ....................... 710/316 |
| 6,577,863 B2 | * | 6/2003 | Bourlas et al. ............. 455/424 |
| 6,650,749 B1 | * | 11/2003 | Laulo .......................... 379/279 |
| 6,687,217 B1 | * | 2/2004 | Chow et al. ................ 370/217 |

FOREIGN PATENT DOCUMENTS

EP        0 978 810 A2 *  9/2000    ........... G08B/25/10

* cited by examiner

Primary Examiner—William Trost
Assistant Examiner—Brandon J. Miller
(74) Attorney, Agent, or Firm—Duane Morris LLP

(57) ABSTRACT

An data stream protection system and method of use is disclosed. The system comprises a plurality of N main transceivers; a plurality of N standby transceivers logically paired with unique N main transceivers; a plurality of N main network adapters logically paired with and operatively in communication with a unique N main transceivers; a standby network adapter; a switching unit connected to each of the standby transceivers and the standby network adapter; and a switching unit controller operatively in communication with the switching unit, the main transceivers, the main network adapters, the standby transceiver, and the standby network adapter. The switching unit controller detects an alarm condition in a main transceiver/network adapter pair and directs a standby transceiver associated with the failed pair to be routed to the standby network adapter through the switching unit. It is emphasized that this abstract is provided to comply with the rules requiring an abstract which will allow a searcher or other reader to quickly ascertain the subject matter of the technical disclosure. It is submitted with the understanding that it will not be used to interpret or limit the scope of meaning of the claims.

20 Claims, 5 Drawing Sheets

---

300 Initiate A Plurality Of Switch Unit Controllers, Each Switching Unit Controller Operatively Associated With A Switching Unit 305 Connect Each Switching Unit To A Predetermined Number Of N Standby Transceivers And A Predetermined Standby Network Adapter, The Switching Unit Being Capable Of Controllably Routing A Single Predetermined One Of The Standby Transceivers To The Standby Network Adapter, Each Standby Transceiver Being Paired With A Unique Main Network Adapter Of The N Main Network Adapters 310 Operatively Pair Each Of The N Main Network Adapters With A Unique One Of N Main Transceivers 315 Associate A Predetermined Set Of N Main Network Adapter/Main Transceiver Pairs And Their Corresponding Standby Transceivers With Each Of The Plurality Of Switching Unit Controllers 320 Detect An Alarm Condition By Each Of The Plurality Of Switching Unit Controllers In At Least One Of (I) A Primary Network Adapter and (II) A Main Transceiver 325 Enable A Routing In The Switching Unit Associated With The Standby Transceiver Associated With The Main Network Adapter/Main Transceiver Pair In Alarm To Operatively Route The Standby Network Adapter To The Standby Transceiver 330 Enable A Routing In A Data Bus In Communication With The Main Network Adapter/Main Transceiver Pair In Alarm And The Standby Network Adapter To Route Data To The Standby Network Adapter That Was Being Routed To The Main Adapter Associated With The Alarm 335 Detect An Alarm In One Of The Plurality Of Switching Unit Controllers By A Switching Unit Controller Of The Plurality Of Switching Unit Controllers That Is Not In Alarm 340 Reallocate The Predetermined Set Of N Main Network Adapters Associated With The Switching Unit Controller In Alarm To The SwitchingUnit Controller Of The Plurality Of Switching Unit Controllers That Is Not In Alarm

DATA STREAM PROTECTION SYSTEM AND METHOD OF USE

BACKGROUND OF THE INVENTION

The present invention relates to a system and method for providing data stream protection useful in telecommunications systems. A Broadband Wireless Access ("BWA") network in a given service area may consist of one or more cells. Within a cell, several sectors can be deployed using sectored antennas at a base station to increase the overall number of subscribers. A point of presence ("POP") for service providers in the BWA network can be located distantly from the base station, e.g. at a central office or a head end, or co-located with the base station. Interconnection between the head end and the base station can be done via numerous methods such as using fiber-optic cable or via high capacity microwave radio in linear, ring, or star configurations.

In a BWA system, high speed data is connected to the base station to be distributed to all the remote stations, e.g. subscribers, such as via a network interface unit which can provide access to the high speed data. Incoming data can use various physical interfaces, such as OC-3, STM-1, DS3, E3, 10/100 Base-T, 1000 Gigabit Ether net, and others. The data is then distributed to individual circuits that process the data belonging to the remote stations associated with the particular sectors. These circuits may contain processors, media access control circuits, modems, and the like.

Each of these circuits is connected to a transceiver which contains all the radio frequency ("IF") circuits. In turn, the transceiver is connected to a sector antenna that will serve remote stations within each covered area. The transceiver is preferably installed outdoor very close to the antenna to minimize loss through antenna feeder cable. As a general rule in data networks, communications pathways such as transceivers and modems are paired, with one modem being accessed by one specific transceiver at a time. Each such pair typically services a single sector.

The base station usually contains also one or more controller circuits that direct the data to appropriate locations. These controller circuits also monitor the status of the BWA system and generate or recognize an alarm when it occurs. Where equipment is redundantly protected, controller circuits may also make a decision to switch the data from a faulty piece of equipment to a standby one.

As also occurs from time to time, one or both components of transceiver/modem pairs will go into an alarm state, e.g. a failure or other degradation state that may impact on the ability of that pair to adequately and accurately provide data to and from the sector. In many cases, the BWA operators have to guarantee very high availability to the subscribers. Thus, there is a need to provide redundancy protection against hardware failure. This protection needs to be automatically triggered to minimize the down time.

The simplest way for redundant protection is to double every hardware component. However this is very costly, increases power consumption, and requires additional space to accommodate the additional circuits. Hence, there is a need for a scheme that provides very high availability with fewer circuits, such as providing one-for-one protection for certain circuits and one-for-many protection for other circuits.

BRIEF DESCRIPTION OF THE DRAWINGS

The features, aspects, and advantages of the present invention will become more fully apparent from the following description, appended claims, and accompanying drawings in which:

DETAILED DESCRIPTION OF THE PREFERRED EMBODIMENT

Figure 1:
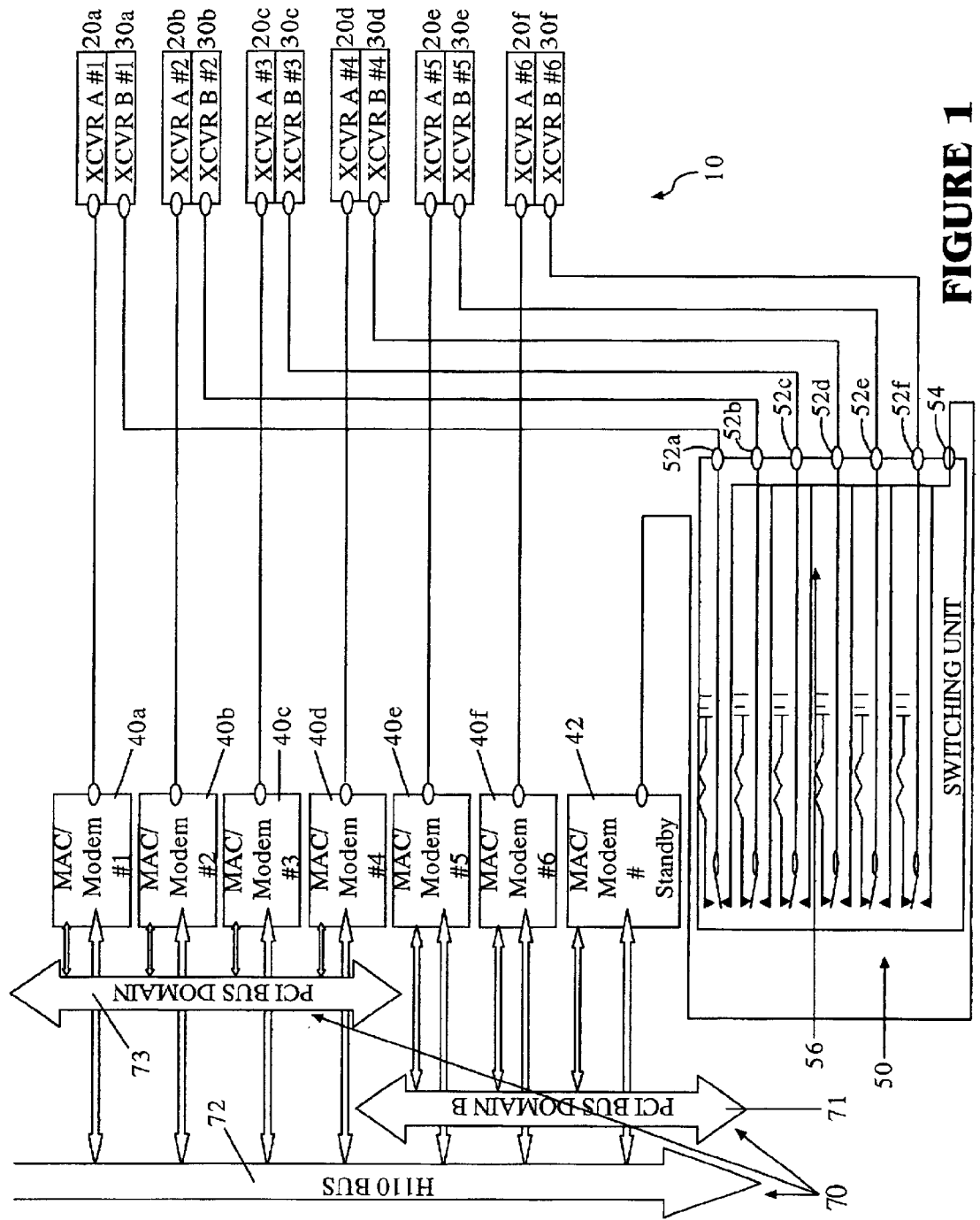
FIG. 1 is a schematic overview a set of paired data transmission devices and a standby device with a switching unit.
Figure 2:
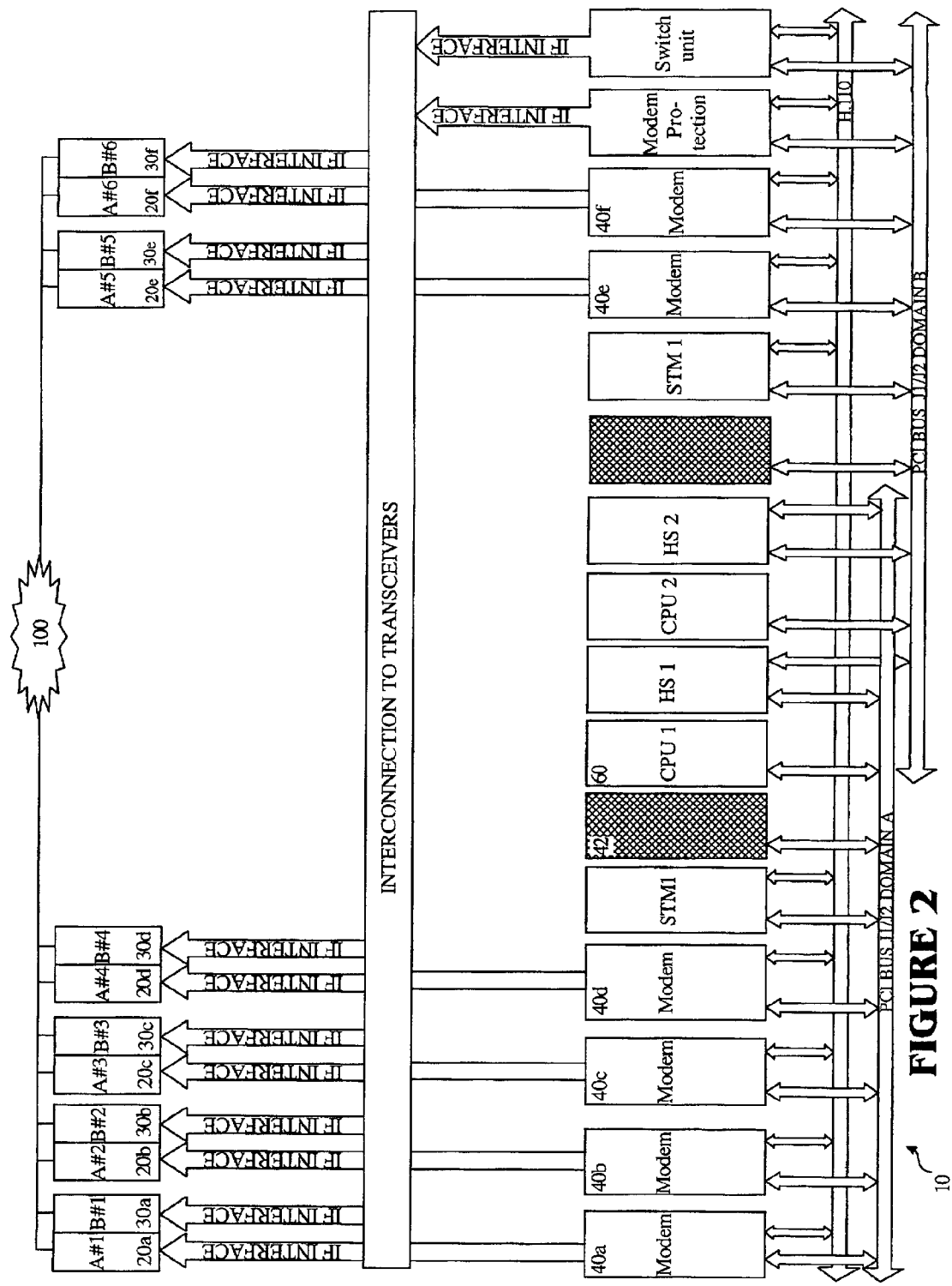
FIG. 2 is a further a schematic overview a set of paired data transmission devices and a standby device with a switching unit.

Referring now to FIG. 1, system 10 provides protected access from a communication device such as a transceiver, generally referred to by "20" and more specifically by 20a–20f, to network 100 (FIG. 2) through a network adapter, generally referred to as "40" and more specifically by 40a–40f. System 10 comprises one or more main transceivers 20, one or more main network adapters 40, standby network adapter 42, switching unit 50, and a switching unit controller 60 (FIG. 2). System 10 further comprises one or more standby transceivers, generally referred to by "30" and more specifically by 30a–30f. In a preferred embodiment, main transceivers 20, standby transceivers 30, and network adapters 40 are a plurality of a predetermined number, referred to herein as "N," of main transceivers 20, N standby transceivers 30, and N network adapters 40. In a further preferred embodiment, N is six.

Each of main transceivers 20 is uniquely paired with and in communication with a predetermined network adapter 40, such as with coax or fiber optic cable. Additionally, each of main transceivers 20 is uniquely paired with a predetermined standby transceiver 30, e.g. main transceiver 20a is uniquely paired with standby transceiver 30a.

Each main network adapter 40 is operatively in communication with a unique predetermined main transceiver 20, e.g. main network adapter 40a is uniquely in communication with main transceiver 20a. Network adapter 40 may be a media access controller, a modem, a route, a bridge, or the like.

Switching unit 50 comprises one or more data ports 52, which in a preferred embodiment are bi directional data ports, for each standby transceiver 30. Each data port 52 is operatively in communication with no more than one unique standby transceiver 30 of the N standby transceivers 30, e.g. data port 52a is operatively in communication only with standby transceiver 30a. Accordingly, each of the standby transceivers 30 is operatively in communication with switching unit 50 via a predetermined, unique data port 52. For example, standby transceiver 30a is associated with data port 52a, standby transceiver 30b is associated with data port 52b, and so on.

Switching unit 50 further comprises network adapter data port 54, operatively in communication with standby network adapter 42. In a preferred embodiment, network adapter data port 54 is bi-directional.

Additionally, controllable link 56 exists in switching unit 50 to allow a connection between a single predetermined data port 52 and network adapter port 54 at any point in time. In a preferred embodiment, standby transceivers 30 not connected to standby network adapter 42 are terminated with a load impedance appropriate for their respective load in any of well known terminations, e.g. hi-Z terminators, lo-Z terminators, and the like. In a preferred embodiment, termination will be appropriate to reduce if not eliminate reflections in the line, such as with a 50 ohm resistor for PG-59 cable.

In a preferred embodiment, a predetermined number of N main transceivers 20, N standby transceivers 30, and N network adapters 40 as well as standby network adapter 42 are hot swap able.

Referring now to FIG. 2, in a preferred embodiment, switching unit controller 60 comprises a CPU and is operatively in communication with switching unit 50 and network adapters 40,42 such as via one or more data and/or control buses 70, e.g. bus 71, bus 72, and bus 73. Switching unit controller 60 is also operatively in communication with main transceivers 20 and standby transceivers 30 such as via coaxial cables. Switching unit controller 60 may comprise a plurality of CUPS operatively in communication over a single bus 70 or a plurality of CPUs operatively in communication over a plurality of buses 70.

Bus 70 may be a PCI bus, an H.110 bus, or the like.

As described more fully below, each transceiver 20,30 and network adapter 40,42 is capable of determining a fault condition affecting that transceiver 20,30 or network adapter 40,42 and report the fault condition as an alarm to switching unit controller 60. Once switching unit controller 60 detects an alarm condition in main transceiver 20 or main network adapter 40, switching unit controller 60 may direct a paired standby transceiver 30 to be routed to standby network adapter 42 through switching unit 50 in response to the detected alarm condition, e.g. if either main transceiver 20*a* or main network adapter 40*a* fail, standby transceiver 30*a* may be routed to standby network adapter 42 to accomplish and protect a data stream associated with the main transceiver 20*a*/main network adapter 40*a* pair. Additionally, switching unit controller 60 will cause data routing on bus 70 which was intended for the failed pair 20*a*,40*a* to be routed through standby transceiver 30*a* and standby network adapter 42.

In certain embodiments, a plurality of switching unit controllers 60 are present and can detect an alarm condition in another switching unit controller 60. As used herein, alarm conditions comprise hard and software failures including out of bounds operations.

Figure 3:
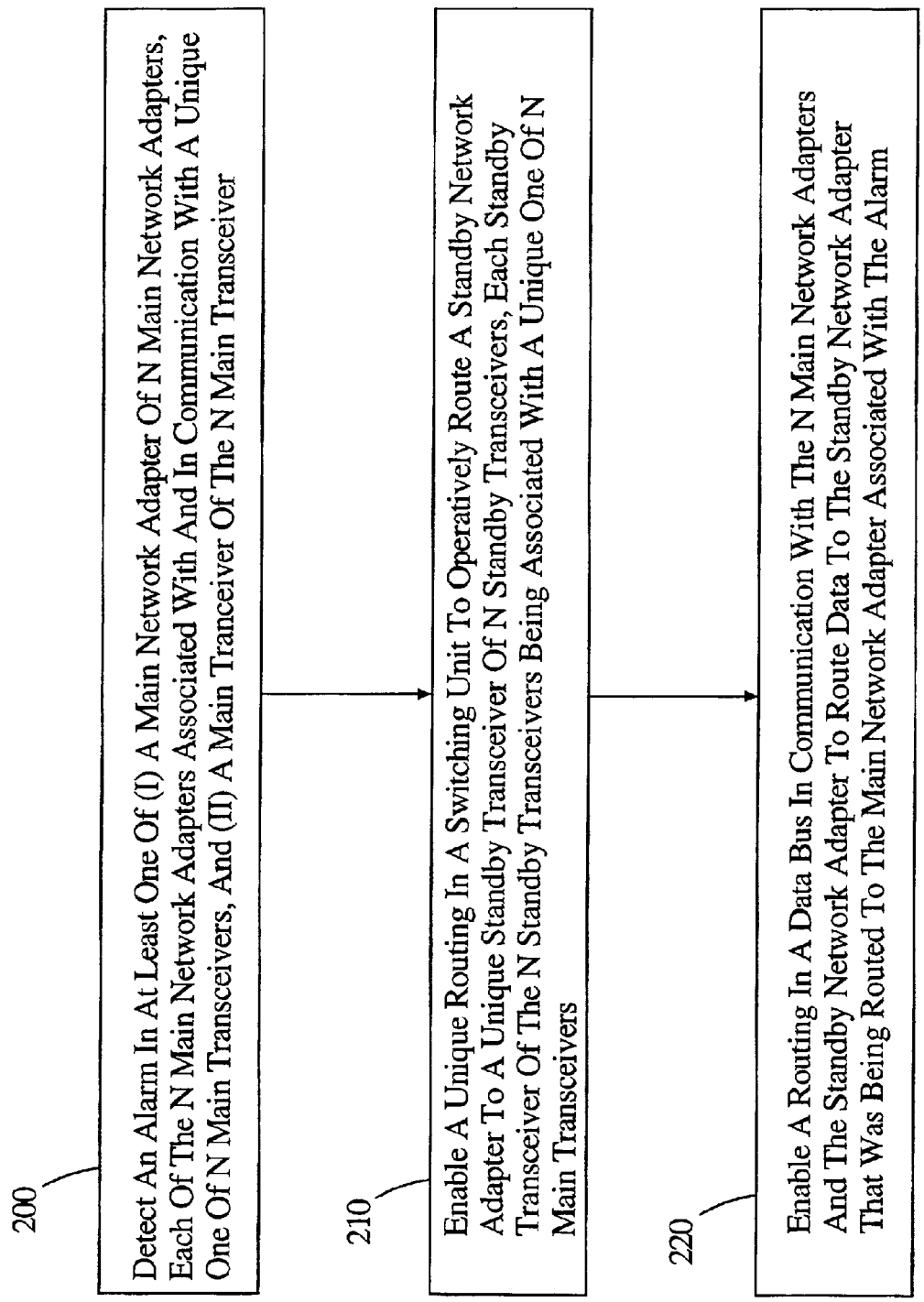
FIG. 3 is a flowchart of a method of the present invention.
Figure 4:
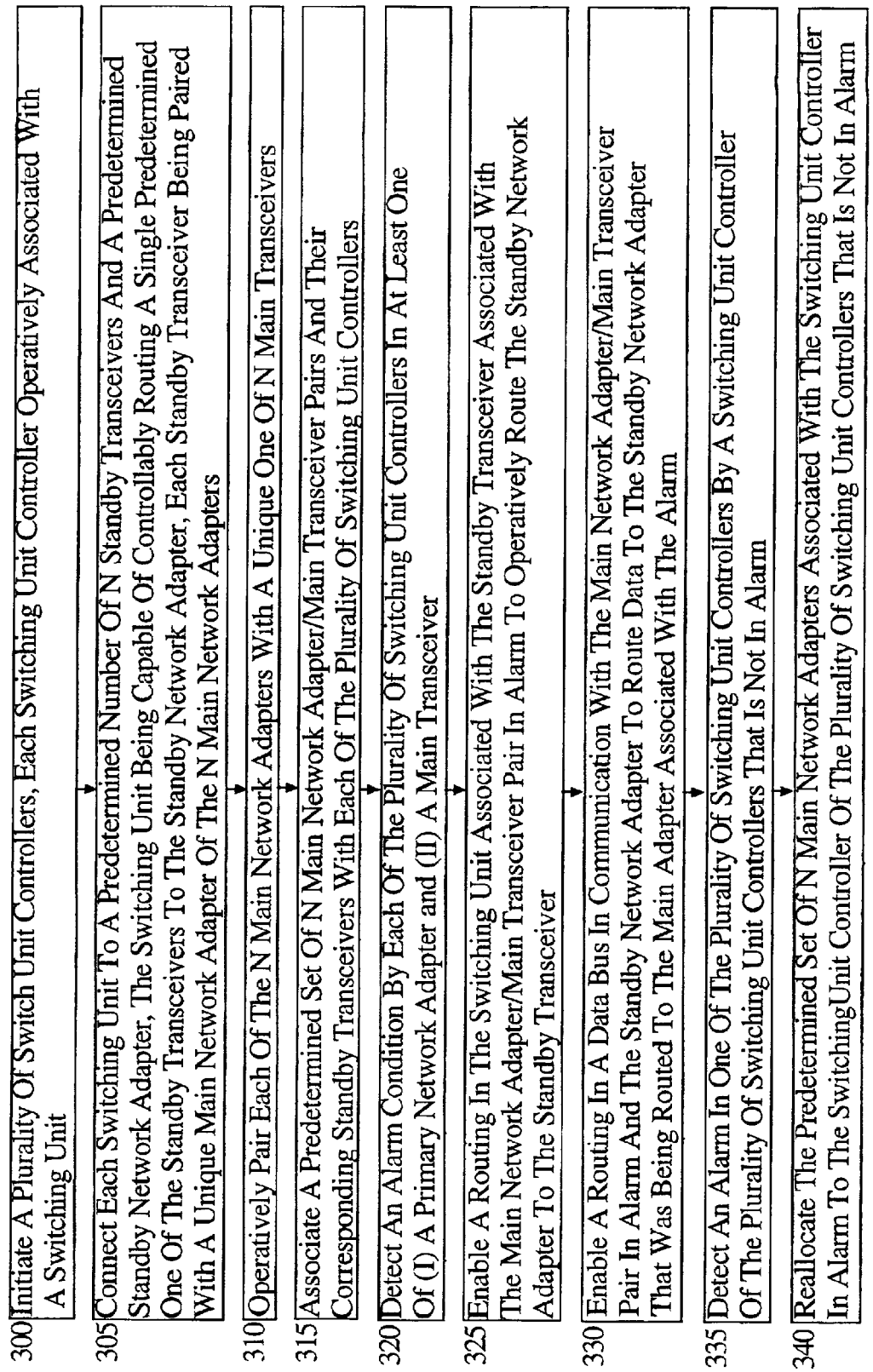
FIG. 4 is a flowchart of an alternative method of the present invention.

In the operation of an exemplary embodiment, referring to FIG. 3 an FIG. 4, data stream transmissions are protected by operatively connecting each main transceiver 20 to a predetermined network adapter 40 and operatively connecting each standby transceiver 30 to a predetermined data port 52 on switching unit 50. Data port 54 is operatively connected to standby network adapter 42. These connections may be accomplished by buses in the same shelf (not shown in the figures), wires such as coax, by fiber optics, or any other equivalent data communications pathway.

Main transceivers 20, standby transceivers 30, network adapters 40,42, and switching unit 50 are logically interconnected. During operation, switching unit controller 60 monitors main transceivers 20, standby transceivers 30, network adapters 40,42, and switching unit 50, detecting alarms generated by main network adapters 40 and/or main transceivers 20. If an alarm condition is detected, switching unit controller 60 enables a unique routing in switching unit 50 to operatively route standby network adapter 42 to a unique standby transceiver 30 associated with the alarm main transceiver 20, such as via communications link 56.

For example, if main network adapter 40*a* generates an alarm, switching unit controller 60 causes switching unit 50 to route standby network adapter 42 through controllable link 56 to standby transceiver 30*a*. Switching unit controller 60 enables a similar routing in bus 70. In this manner, data traffic is rerouted from main network transceiver/network adapter pair 20*a*,40*a* through standby transceiver 30a and standby network adapter 42.

In certain embodiments, routing is accomplished using a predetermined priority designator associated with main network adapters 20. For example, main network adapter 20*b* may have a higher priority than main network adapter 20*a*. If both network adapter 20*a* and main network adapter 20*b* go into alarm, Switching unit controller 60 will enable routing to network adapter 20*b*. The priority designator may be programmable.

In the absence of an alarm condition, standby network adapter 42 is connected to a predetermined standby transceiver 30 such as one with a highest priority designator or a predetermined default standby transceiver 30.

Figure 5:
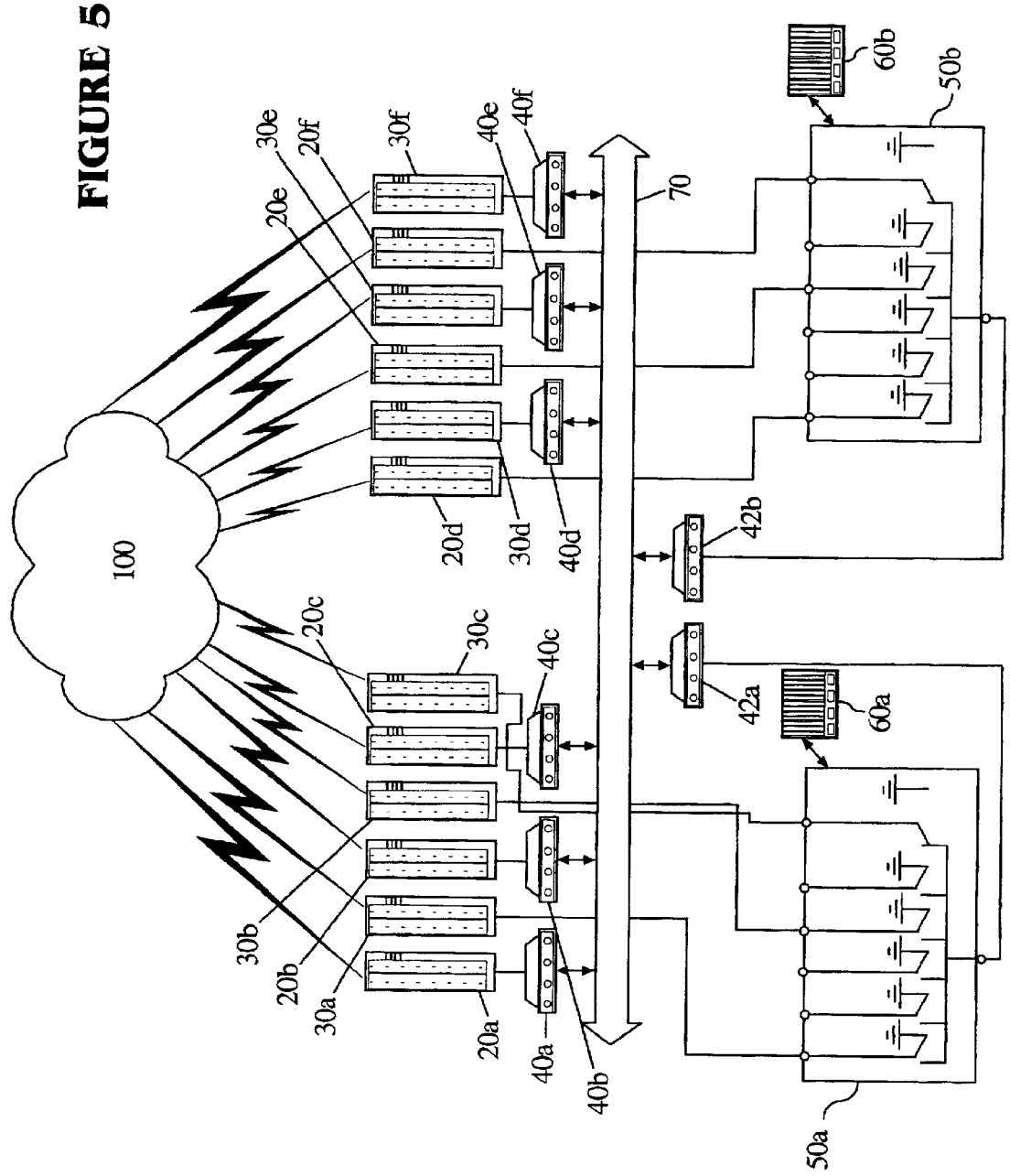
FIG. 5 is a schematic of an exemplary redundant embodiment of the present invention.

Referring now to FIG. 5, in certain embodiments, a plurality of switching units 50 and switching unit controllers 60 may be present. Data stream transmission may be protected by initiating the plurality of switching unit controllers 60 and associating a predetermined set of main network adapters 40 with each of the plurality of switching unit controllers 60. For example, switching unit controller 60*a* may be associated with all of main transceivers 20 and their paired main network adapters 40, in which case switching unit controller 60*b* is associated with no main transceiver 20 or paired main network adapter 40. Alternatively, switching unit controller 60*a* may be associated with a subset, e.g. main transceivers 20*a*, 20*b*, and 20*c* and their paired main network adapters 40*a*, 40*b*, and 40*c*, while the remainder of main transceivers 20 and their paired main network adapters 40 are associated with switching unit controller 60*b*.

As before, each switching unit controller 60*a*,60*b* monitors and detects an alarm condition in their associated main transceivers 20 and main network adapters 40. Upon an alarm condition, each switching unit controller 60*a*,60*b* enables a unique routing in their associated switching unit 50*a*,50*b* to operatively route standby network adapter 42,43 to a unique standby transceiver 30 associated with alarmed main transceiver 20/main network adapter 40 pair.

Additionally, each switching unit controller 60*a*,60*b* can monitor the other switching unit controller 60*a*,60*b* and detect an alarm in the other switching unit controller 60*a*, 60*b*. Upon detection of an alarm, the non-alarmed switching unit controller 60*a*,60*b* can reallocate the alarmed switching unit controller 60*a*,60*b* associated main transceiver 20/main network adapter 40 pairs to be associated with the non-alarmed switching unit controller 60*a*,60*b*.

In a preferred embodiment, each switching unit controller 60*a*,60*b* also monitors standby network adapter 42 and standby transceivers 30 and does not direct switching unit 50 and/or bus 70 to switch to standby network adapter 42 if either standby network adapter 42 or the required standby transceiver 30 is in alarm.

In certain other embodiments, a plurality of switching unit controllers 60*a*,60*b* can interface with and control a single switching unit 50.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A system for protecting transmission of a data stream, comprising:
   a. a plurality of a predetermined N number of main transceivers;
   b. a plurality of N standby transceivers, each of the N standby transceivers being logically paired with a unique one of the N main transceivers;
   c. a plurality of N main network adapters, each of the N main network adapters operatively in communication with a unique one of the N main transceivers;
   d. a standby network adapter;
   e. a switching unit, the switching unit further comprising:
      i. N transceiver device ports, each operatively in communication with no more than one unique N standby transceiver; and
      ii. a network adapter port, operatively in communication with the standby network adapter; and
      iii. a controllable link defining a communication path between a predetermined one of the N transceiver device ports and the network adapter port; and
   f. a switching unit controller operatively in communication with the switching unit, the main transceivers, the main network adapters, the standby transceiver, and the standby network adapter, the switching unit controller capable of:
      i. detecting an alarm condition in a main transceiver;
      ii. detecting an alarm condition in a main network adapter; and
      iii. directing a standby transceiver to be routed to the standby network adapter through the switching unit in response to the detected alarm condition.

2. A system according to claim 1, wherein:
   a. each of the main transceivers, standby transceivers, main network adapters, and standby network adapters is capable of determining a fault condition and reporting the fault condition as an alarm to the switching unit controller.

3. A system according to claim 1, wherein:
   a. N is at least 6.

4. A system according to claim 1, wherein:
   a. at least one of (i) predetermined number of the N main transceivers, (ii) a predetermined number of the N standby transceivers, and (iii) a predetermined number of the network adapters are hot swapable.

5. A system according to claim 1, wherein:
   a. each of the N main transceivers is operatively connected to a unique predetermined one of the N network adapters.

6. A system according to claim 5, wherein:
   a. the connection is accomplished using a coax cable.

7. A system according to claim 1, wherein:
   a. each of the standby transceivers is connected to a unique communication device port of the N communication device ports of the switching unit.

8. A system according to claim 1, wherein:
   a. the main network adapters and the standby network adapter are at least one of (i) a media access controller and (ii) a modem.

9. A system according to claim 1, wherein:
   a. only a single one of the N standby transceivers is in communication with the standby network adapter at a point in time.

10. A system according to claim 9, wherein:
    a. a standby transceiver not connected to the standby communication device are connected to a predetermined impedance load termination.

11. A system according to claim 1, wherein:
    a. the switching unit controller comprises a CPU operatively in communication with the switching unit and the network adapters over a bus.

12. A system according to claim 11, wherein:
    a. the bus is at least one of (i) a PCI bus and (ii) an H.110 bus.

13. A system according to claim 1, wherein:
    a. the switching unit controller comprises at least one of (i) plurality of CPUs operatively in communication over a single bus and (ii) plurality of CPUs operatively in communication over a plurality of buses.

14. A method of protecting transmission of a data stream, comprising:
    a. detecting an alarm in at least one of (i) a main network adapter of N main network adapters, each of the N main network adapters associated with and in communication with a unique one of N main transceivers, and (ii) a main transceiver of the N main transceiver;
    b. selectively enabling a unique routing from a plurality of routings in a switching unit, each routing to operatively route a standby network adapter to a unique standby transceiver of N standby transceivers, each standby transceiver of the N standby transceivers being associated with a unique one of N main transceivers; and
    c. enabling a routing in a data bus in communication with the N main network adapters and the standby network adapter to route data to the standby network adapter that was being routed to the main network adapter associated with the alarm.

15. A method according to claim 14, wherein:
    a. the selected enabling is accomplished using a predetermined priority designator associated with the N main network adapter/transceiver pairs.

16. A method according to claim 15, wherein:
    a. the priority designator is programmable.

17. A method according to claim 15, wherein:
    a. in the absence of an alarm condition, the standby network adapter is connected to at least one of (i) a standby transceiver with a highest priority designator and (ii) a default standby transceiver.

18. A method according to claim 14, wherein:
    a. switching is not enabled if the standby network adapter is in alarm; and
    b. switching is not enabled if the standby transceiver is in alarm.

19. A method of protecting transmission of a data stream, comprising:
    a. initiating a plurality of switching unit controllers, each switching unit controller operatively associated with a switching unit;
    b. connecting each switching unit to a predetermined number of N standby transceivers and a predetermined standby network adapter, the switching unit being capable of controllably routing a single predetermined one of the standby transceivers to the standby network adapter, each standby transceiver being paired with a unique main network adapter of the N main network adapters;
    c. operatively pairing each of the N main network adapters with a unique one of N main transceivers;
    d. associating a predetermined set of N main network adapter/main transceiver pairs and their corresponding standby transceivers with each of the plurality of switching unit controllers;

e. detecting an alarm condition by each of the plurality of switching unit controllers in at least one of (i) a primary network adapter and (ii) a main transceiver;

f. enabling a unique routing in the switching unit associated with the standby transceiver associated with the main network adapter/main transceiver pair in alarm to operatively route the standby network adapter to the standby transceiver;

g. enabling a routing in a data bus in communication with the main network adapter/main transceiver pair in alarm and the standby network adapter to route data to the standby network adapter that was being routed to the main network adapter associated with the alarm;

h. detecting an alarm in one of the plurality of switching unit controllers by a switching unit controller of the plurality of switching unit controllers that is not in alarm; and i. reallocating the predetermined set of N main network adapters associated with the switching unit controller in alarm to the switching unit controller of the plurality of switching unit controllers that is not in alarm.

20. A method according to claim 19, wherein:

a. switching is not enabled if the standby network adapter is in alarm.

\* \* \* \* \*